United States Patent
Inoue et al.

(10) Patent No.: US 8,752,246 B2
(45) Date of Patent: Jun. 17, 2014

(54) ELECTRONIC APPARATUS WITH DETACHABLE AND OPENABLE LID

(75) Inventors: Nobuyuki Inoue, Kawasaki (JP); Satoshi Kawase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 12/862,446

(22) Filed: Aug. 24, 2010

(65) Prior Publication Data
US 2011/0049174 A1    Mar. 3, 2011

(30) Foreign Application Priority Data
Aug. 31, 2009    (JP) ................................ 2009-199667

(51) Int. Cl.
*B65D 43/22*    (2006.01)
*E05D 7/10*    (2006.01)

(52) U.S. Cl.
USPC ................ 16/229; 396/539; 16/282; 220/830

(58) Field of Classification Search
USPC ............ 220/827, 830; 16/282, 294, 302, 303, 16/307, 308, 366, 386, 230, 229, 221, 16/304; 361/627.27, 727; 455/575.3, 455/575.4; 396/539
See application file for complete search history.

(56) References Cited

U.S. PATENT DOCUMENTS

| | | | | |
|---|---|---|---|---|
| 2,853,924 A | * | 9/1958 | Herzfeld et al. | 351/113 |
| 2,938,746 A | * | 5/1960 | Willman | 292/336.3 |
| 3,403,473 A | * | 10/1968 | Navarro | 49/193 |
| 3,455,061 A | * | 7/1969 | Kesling et al. | 49/382 |
| 4,193,164 A | * | 3/1980 | Okayama | 16/297 |
| 5,845,366 A | * | 12/1998 | Kuroda | 16/229 |
| 5,926,916 A | * | 7/1999 | Lee et al. | 16/230 |

FOREIGN PATENT DOCUMENTS

| | | |
|---|---|---|
| EP | 1944818 | 7/2008 |
| JP | 2008-167374 | 7/2008 |

\* cited by examiner

*Primary Examiner* — Mickey Yu
*Assistant Examiner* — Chun Cheung
(74) *Attorney, Agent, or Firm* — Cowan, Liebowitz & Latman, P.C.

(57) ABSTRACT

An electronic apparatus excellent in workability in mounting a lid to an apparatus housing. The electronic apparatus comprises a housing having a pair of bearing portions, and a battery lid unit having a pair of shafts for being rotatably fitted in the bearing portions, respectively. A movable shaft of the shafts is axially retractable, and the battery lid unit is openable and closable with respect to the housing about the shafts. An urging spring has a contact portion for contact with the housing, and urges the battery lid unit in an opening direction with respect to the housing. The contact portion is moved according to retraction of the movable shaft such that an urging range through which the urging member urges the lid in the opening direction becomes smaller than a range of the pivotal motion of the lid with respect to the housing.

12 Claims, 8 Drawing Sheets

ELECTRONIC APPARATUS WITH DETACHABLE AND OPENABLE LID

BACKGROUND OF THE INVENTION

1. Field of the Invention

The present invention relates to an electronic apparatus having an openable and closable lid detachably mounted to a housing thereof.

2. Description of the Related Art

Conventionally, there have been proposed electronic apparatuses each having a lid which can be opened and closed by a user, such as a battery lid that covers an opening of a battery compartment formed within a housing. Some electronic apparatuses each having a lid that can open and close a housing thereof permit the lid to be detached from a housing of the apparatus by a special operation different from a normal opening or closing operation.

For example, in an electronic apparatus having a battery compartment in which a larger external power supply than a general-purpose battery can be inserted, when a battery lid is opened and the external power supply is mounted in the battery compartment, a portion of the external power supply protrudes from the battery compartment. This brings about a problem of interference between the battery lid and the external power supply. To avoid this interference, there has been proposed an electronic apparatus having a lid-holding structure that permits the battery lid to be detached from the housing by a battery removing operation before the external power supply is mounted in the battery compartment.

As the electronic apparatus having a lid detachable from an apparatus housing thereof as described above, one described below has been proposed (see e.g. Japanese Laid-Open Patent Publication No. 2008-167374). The electronic apparatus disclosed in this publication has a housing formed with an opening in which the lid is fitted, and the opening has an inner wall thereof formed with at least one pair of holes. The lid has protruding portions protruding from respective sides thereof such that they can be fitted in the respective holes formed in the inner wall of the opening. The holes in the inner wall of the opening of the housing and the protruding portions of the lid are fitted to each other, whereby the lid is engaged with the housing.

One of the protruding portions of the lid can be disengaged from the associated hole by user operation. In a state where the one protruding portion is disengaged, the other protruding portion in engagement with the other hole is used as a support to pivotally move the lid to thereby cause the lid to be lifted, thereby placing the lid in a state having one side thereof floated from the opening of the housing. In this state, the other protruding portion is removed from the hole remaining engaged therewith, whereby the lid is detached. The lid can be mounted to the housing in a sequence reverse to the above-described sequence of operations for detaching the same.

Next, with reference to FIGS. 7A and 7B, a description will be given of a lid-holding structure in which an engaging portion between the housing of an electronic apparatus and a lid of the same serves as a rotary shaft about which the lid pivotally moves to open and close.

Figure 7A:
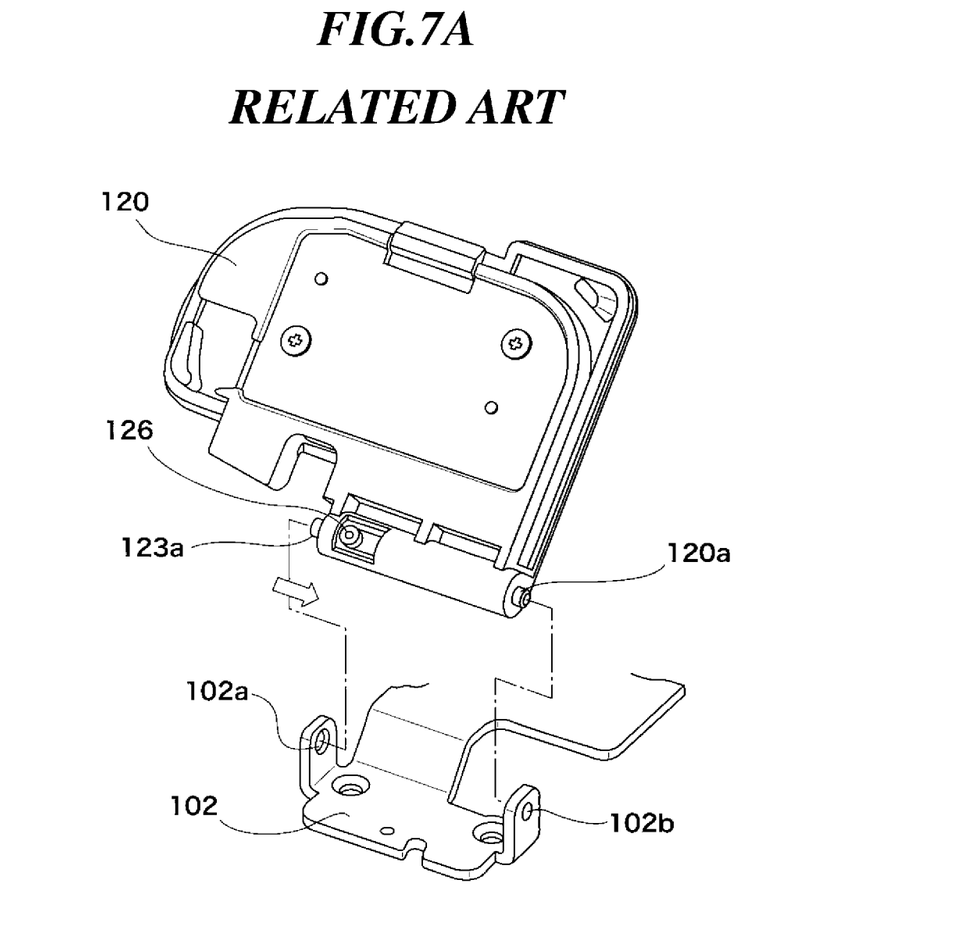
FIG. 7A is a perspective view of a lid and a lid-holding member of a conventional electronic apparatus.
Figure 7B:
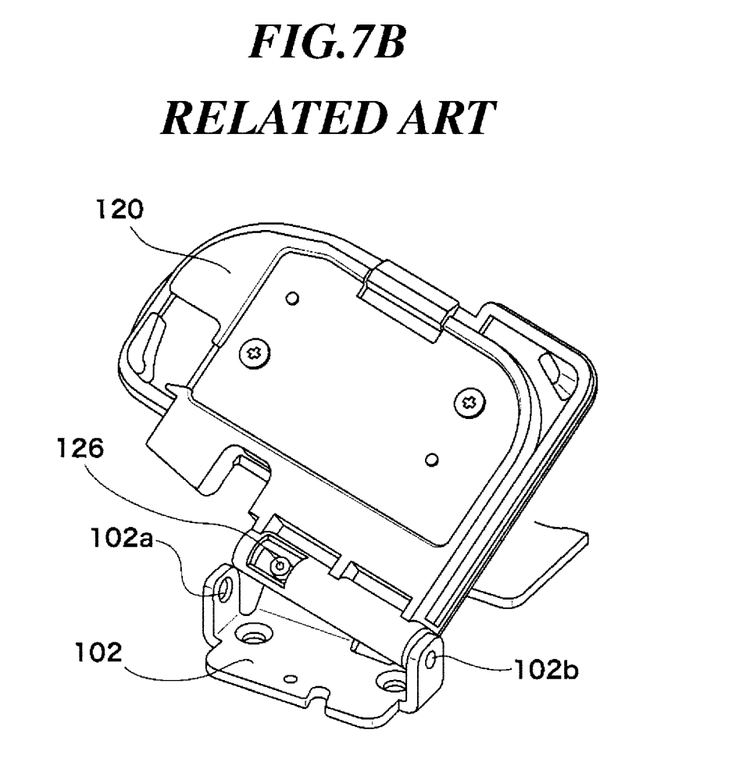
FIG. 7B is a perspective view of the lid and the lid-holding member in a state in which the lid has been lifted to a position where one end of the lid is higher than the lid-holding member.

FIGS. 7A and 7B are views of the lid and the lid-holding member of a conventional electronic apparatus. FIG. 7A is a perspective view of the lid and the lid-holding member in a separate state, and FIG. 7B is a perspective view of the lid and the lid-holding member in a state in which one end of the lid has been lifted to a position higher than the lid-holding member.

In FIGS. 7A and 7B, the lid 120 has shafts 123a and 120a protruding from respective opposite sides thereof, and the shafts 123a and 120a are caused to be engaged with respective bearing portions 102a and 102b formed in the lid-holding member 102 provided on the housing of the electronic apparatus (see FIG. 7A), whereby the lid 120 is held by the lid-holding member 102. The engagement attaches the lid 120 to the housing of the electronic apparatus. The shafts 123a and 120a of the lid 120 are disposed on the same axis, so that the lid 120 can pivotally move about a line connecting between the respective centers of the shafts 123a and 120a as a rotation axis.

The motion of the shaft 123a of the lid 120 is interlocked with the operation of a shaft-operating member 126, and the shaft 123a can be retracted into the lid 120 by sliding the shaft-operating member 126 sideways as indicated by an arrow (see FIG. 7A). This operation releases the engagement between the shaft 123a and the bearing portion 102a. Further, in the state where the engagement between the shaft 123a and the bearing portion 102a has been released, the lid 120 is lifted using the bearing portion 102b as a support such that one end of the lid 120 becomes higher than the lid-holding member 102 (see FIG. 7B), and then the shaft 120a is disengaged from the bearing portion 102b. Thus, the lid-holding structure enables the lid 120 to be detached from the lid-holding member 102.

To improve the operability of the lid in an opening direction in the above-described conventional electronic apparatus, it is desirable to urge the lid in the opening direction such that it is automatically opened to a predetermined position when the lid is unlocked. In order to urge the lid in the opening direction, it is necessary to bring an urging member acting in the opening direction to be brought into urging contact with the housing and the lid.

However, in the case of the conventional electronic apparatus which has the detachable lid as described above, if the urging member is provided, it becomes necessary to mount the lid to the housing of the electronic apparatus while urging the above-mentioned urging member, which makes it difficult to perform the lid mounting work. Further, if the urging force of the urging member is limited so as to prevent the same from hampering the lid mounting work, it becomes impossible for the urging member to cause the lid to open to a sufficiently wide opening angle.

SUMMARY OF THE INVENTION

The present invention provides an electronic apparatus excellent in workability in mounting a lid to an apparatus housing.

The present invention provides an electronic apparatus comprising a housing configured to have a pair of bearing portions, a lid configured to have a pair of shafts for being rotatably fitted in the bearing portions of the housing, respectively, at least one shaft of the air of shafts being configured to be retractable in an axial direction, and the lid being openable and closable with respect to the housing about the pair of shafts, and an urging member configured to have a contact portion for contact with the housing and urge the lid in an opening direction of the lid with respect to the housing, wherein the contact portion is moved in a manner interlocked with retraction of the at least one shaft of the lid such that an urging range through which the urging member urges the lid in the opening direction becomes smaller than a range of pivotal motion of the lid with respect to the housing.

According to the present invention, it is possible to improve workability in mounting the lid to the apparatus housing.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing an embodiment thereof.

Figure 1:
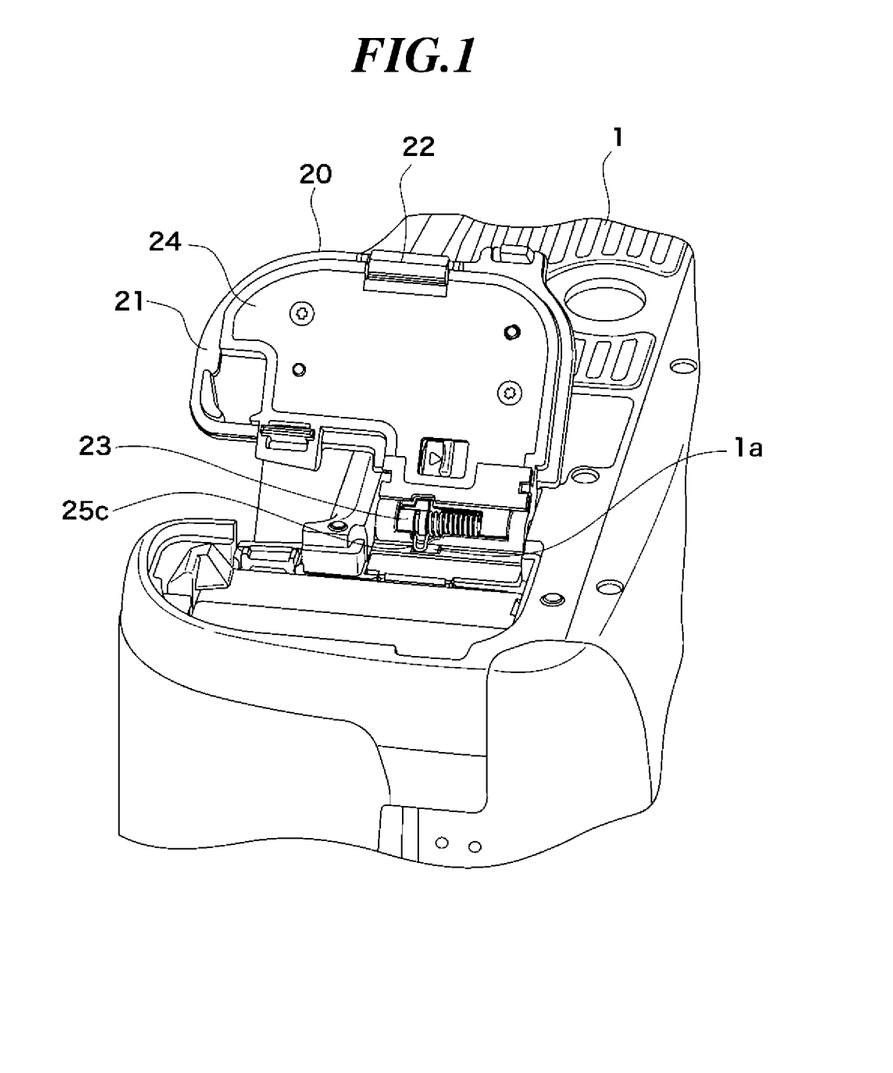
FIG. 1 is a perspective view showing an apparatus housing and a battery lid unit of an image pickup apparatus as an electronic apparatus according to an embodiment of the present invention.

FIG. 1 is a perspective view showing an apparatus housing and a battery lid unit of an image pickup apparatus as an electronic apparatus according to the embodiment of the present invention.

Referring to FIG. 1, in the present embodiment, the image pickup apparatus as the electronic apparatus is formed as a digital camera comprising an apparatus housing 1 having a battery compartment, and a battery lid unit 20 as a lid for closing the battery compartment. The battery lid unit 20 is mounted to the apparatus housing 1 such that it can open and close the apparatus housing 1, and comprises a lid body 21, a lid lock claw 22, a slide shaft 23, and a battery lid cover 24. The battery lid unit 20 is constructed such that the lid body 21 and the battery lid cover 24 are fixed to each other with screws to thereby sandwich the lid lock claw 22 and the slide shaft 23 therebetween. FIG. 1 shows a state where the battery lid unit 20 is opened to an abutment position in an opening direction.

The battery lid unit 20 can be pivotally moved in the opening direction to a position required and sufficient for securing excellent mounting and dismounting operability of a battery in and from the battery compartment of the apparatus housing 1. In the present embodiment, the battery lid unit 20 is configured to be pivotally movable through approximately 120 degrees from the apparatus housing 1 so as to secure the excellent mounting and dismounting operability of the battery in and from the battery compartment. Further, the battery lid unit 20 is detachable from the apparatus housing 1. The construction enabling detachment of the battery lid unit 20 will be described in detail hereinafter. It should be noted that reference numeral 25c denotes a protruding portion of an urging member 25, referred to hereinafter.

Figure 2:
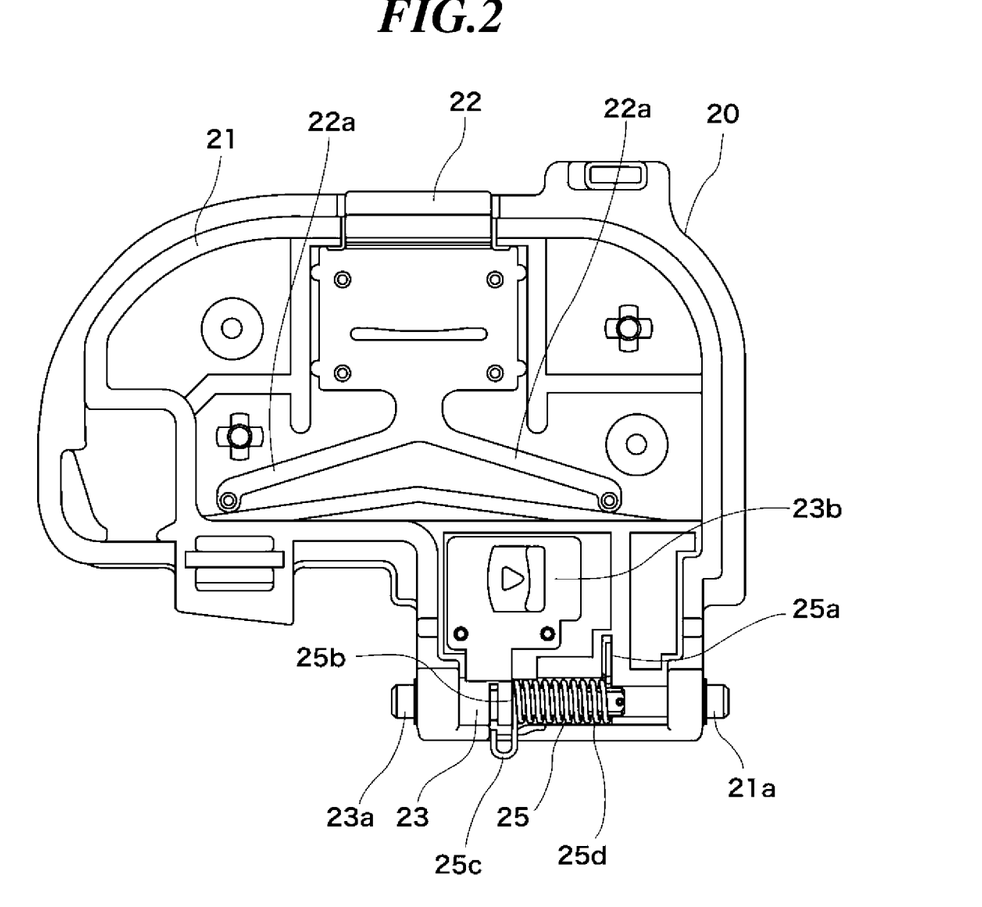
FIG. 2 is a view showing the internal construction of the battery lid unit in a state a battery lid cover thereof has been removed.

FIG. 2 is a view showing the internal construction of the battery lid unit 20 in a state in which the battery lid cover 24 has been removed therefrom.

Referring to FIG. 2, the lid lock claw 22 of the battery lid unit 20 can be slid horizontally along the lid body 21, and is urged by a lid lock claw-urging part 22a such that a front end of the lid lock claw 22 protrudes from the lid body 21. The lid lock claw 22 has a claw-operating part (not shown) integrally formed therewith. The front end of the lid lock claw can be retracted into the lid body 21 by sliding the claw-operating part of the lid lock claw 22.

The slide shaft 23 is integrally formed with a movable shaft 23a that can be axially retracted and a shaft-operating part 23b. The shaft-operating part 23b of the slide shaft 23 is constructed such that it can be slid and is exposed from an opening of the battery lid cover 24 (see FIG. 1). By sliding the shaft-operating part 23b of the slide shaft 23, the movable shaft 23a is moved in the axial direction (retracting direction, i.e. rightward, as viewed in FIG. 2), whereby the movable shaft 23a can be retracted into the lid body 21.

The lid body 21 is integrally formed with a fixed shaft 21a. The fixed shaft 21a of the lid body 21 and the movable shaft 23a of the slide shaft 23 (a pair of shafts) are disposed such that they are on the same axis. The fixed shaft 21a of the lid body 21 and the movable shaft 23a of the slide shaft 23 are pivotally fitted, respectively, in a pair of bearing portions formed in the apparatus housing 1, whereby the battery lid unit 20 is pivotally supported on the apparatus housing 1.

The urging spring (urging member) 25 is provided with a coil part 25d that acts both as a compression spring and as a torsion spring. The coil part 25d of the urging spring 25 has one end (fixed end) 25a thereof in contact with the lid body 21 and another end (movable-side coil end) 25b thereof in contact with the slide shaft 23 by an urging force generated from compression of the coil part 25d. This causes the urging spring 25 to urge the slide shaft 23 such that it is protruded from the lid body 21.

A portion extended from the movable-side coil end 25b of the urging spring 25 is formed with the protruding portion 25c as a contact portion for contact with the apparatus housing 1. In a state where the battery lid unit 20 has been mounted to the apparatus housing 1, the protruding portion 25c of the urging spring 25 is in contact with a contact portion 1a (see FIG. 1) of the apparatus housing 1 by an urging force generated by torsion of the coil part 25d. This causes the urging spring 25 to urge the battery lid unit 20 such that it is pivotally moved in the opening direction.

In the present embodiment, the urging spring 25 is a resilient member that urges the movable shaft 23a of the slide shaft 23 in the protruding direction opposite to the retracting direction by the urging force of the coil part 25d acting in an expanding direction thereof, and urges the battery lid unit 20 by the urging force of the coil part 25d acting in the torsional direction such that the battery lid unit 20 is pivotally moved in the opening direction.

Figure 3:
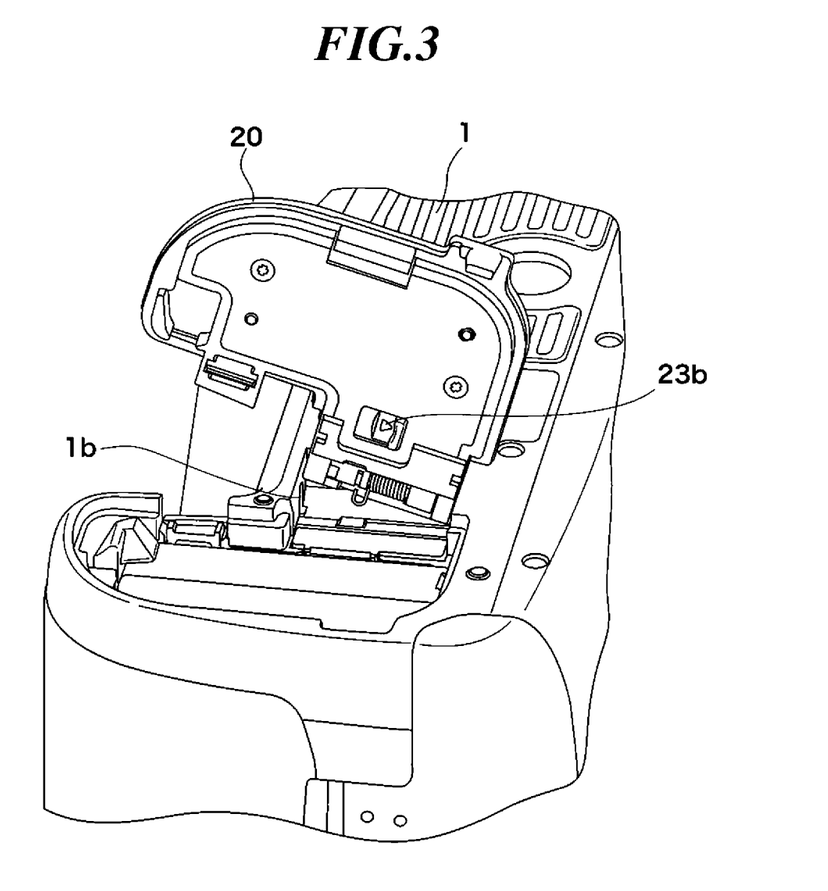
FIG. 3 is a perspective view useful in explaining work for mounting the battery lid unit to the apparatus housing.

FIG. 3 is a perspective view useful in explaining work for mounting the battery lid unit 20 to the apparatus housing 1.

Referring to FIGS. 2 and 3, in mounting the battery lid unit 20 to the apparatus housing 1, the fixed shaft 21a is fitted in one of the bearing portions (not shown) of the apparatus housing 1, with the battery lid unit 20 being held in a position opened from the apparatus housing 1 and substantially at right angles to the same. Further, the movable shaft 23a is retracted into the lid body 21 by sliding the shaft-operating part 23b, and while holding the shaft-operating part 23b in the slid state, the battery lid unit 20 is pivotally moved using the fixed shaft 21a of the lid body 21 as a support such that the movable shaft 23a is brought to a position where the movable shaft 23a can be fitted in the other bearing portion 1b of the apparatus housing 1. Then, the holding of the shaft-operating part 23b is released to thereby cause the movable shaft 23a to protrude and fit in the other bearing portion 1b. An operation for detaching the battery lid unit 20 from the apparatus housing 1 is performed in a sequence of operations reverse to the above.

Next, with reference to FIGS. 4A to 4C and 5A to 5C, a description will be given of the action of the urging spring 25 caused by the operation of the slide shaft 23 performed for mounting the battery lid unit 20 to the apparatus housing 1.

Figures 4A, 4B:
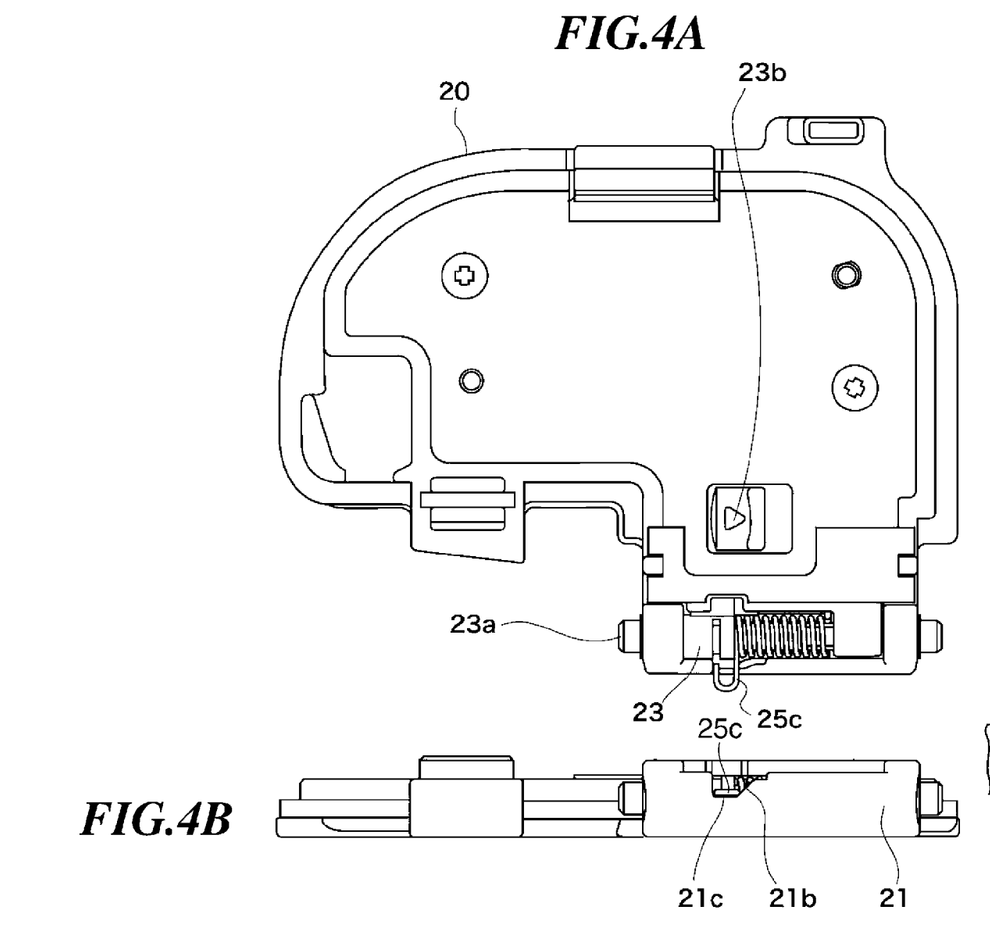
FIG. 4A is a front view of the battery lid unit in a state where a movable shaft of a slide shaft is protruded.
FIG. 4B is a bottom view of the battery lid unit in the state where the movable shaft of the slide shaft is protruded.
Figure 4C:
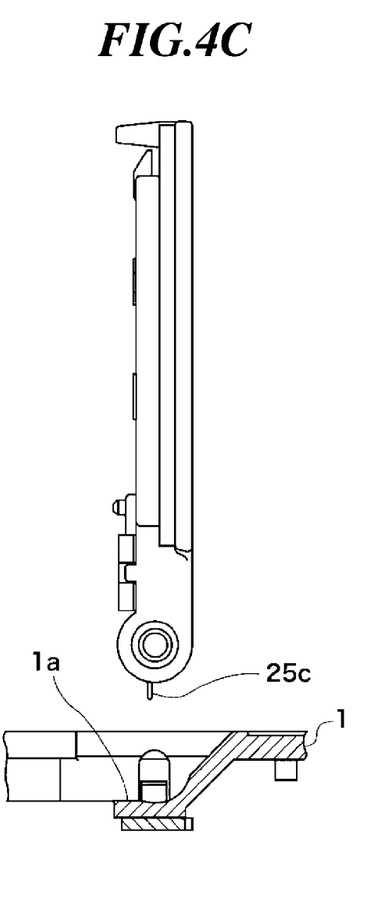
FIG. 4C is a right side view of the battery lid unit in the state where the movable shaft of the slide shaft is protruded, together with the apparatus housing.
Figure 5A:
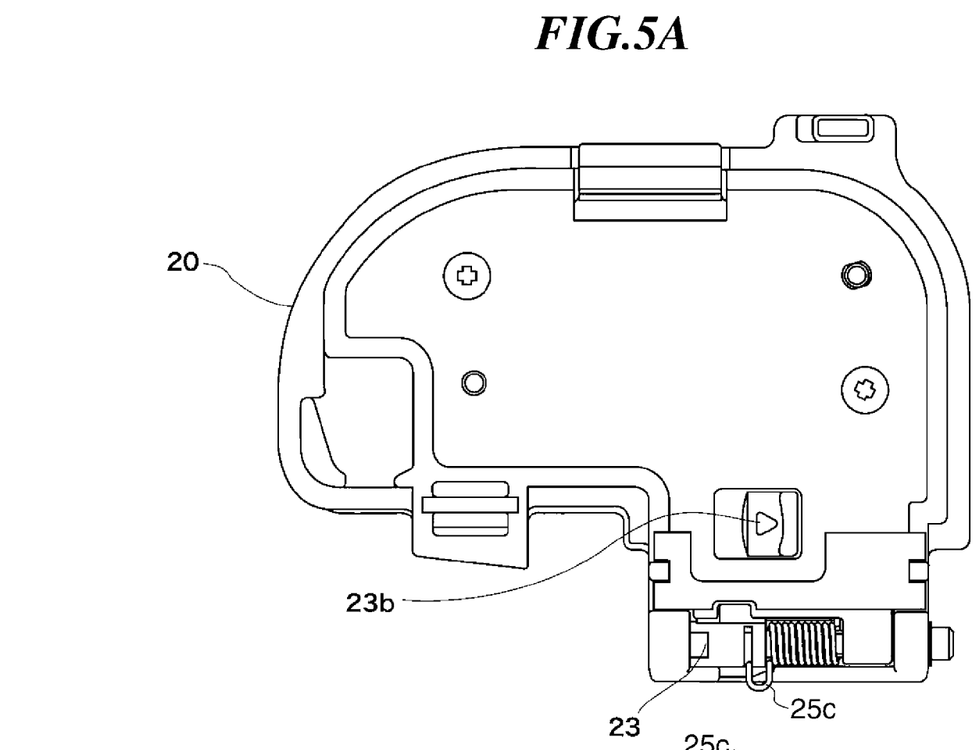
FIG. 5A is a front view of the battery lid unit in a state where the movable shaft of the slide shaft is retracted.
Figure 5B:
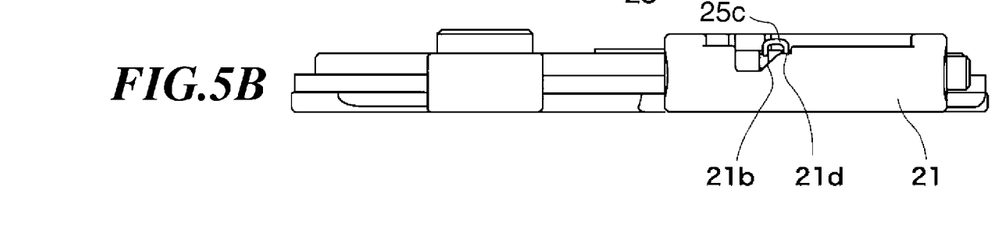
FIG. 5B is a bottom view of the battery lid unit in the state where the movable shaft of the slide shaft is retracted.
Figure 5C:
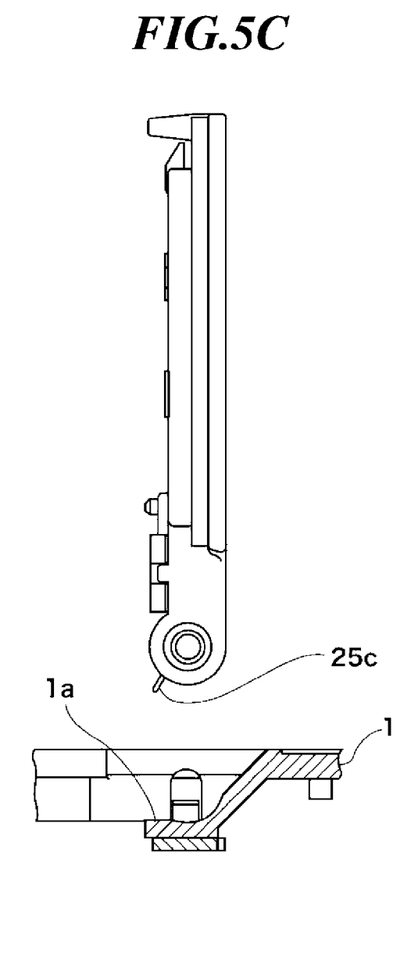
FIG. 5C is a right side view of the battery lid unit in the state where the movable shaft of the slide shaft is retracted, together with the apparatus housing.

FIGS. 4A to 4C are views of the battery lid unit 20 in a state where the movable shaft 23a of the slide shaft 23 is protruded. FIG. 4A is a front view, FIG. 4B is a bottom view, and FIG. 4C is a right side view in which the apparatus housing 1 is also illustrated. FIGS. 5A to 5C are views of the battery lid unit 20 in a state where the movable shaft 23a of the slide shaft 23 is retracted. FIG. 5A is a front view, FIG. 5B is a bottom view, and FIG. 5C is a right side view in which the apparatus housing 1 is also illustrated.

Referring to FIGS. 4A to 4C and 5A to 5C, the lid body 21 of the battery lid unit 20 is formed with a cam portion 21b for contact with the protruding portion 25c of the urging spring 25. The protruding portion 25c of the urging spring 25 is torsionally urged in an anticlockwise direction, as viewed in FIGS. 4C and 5C, whereby it is brought into contact with the cam portion 21b of the lid body 21. In the state where the movable shaft 23a of the slide shaft 23 is protruded from the lid body 21, the protruding portion 25c of the urging spring 25 is in contact with a portion 21c of the cam portion 21b of the lid body 21. In the state illustrated in FIG. 4C, the protruding portion 25c of the urging spring 25 protrudes downward substantially in parallel relation to a plane direction of the battery lid unit 20.

When the shaft-operating part 23b of the slide shaft 23 is operated rightward, as viewed in FIG. 4A, to thereby cause the movable shaft 23a to retract into the lid body 21, the protruding portion 25c of the urging spring 25 also moves rightward, as shown in FIG. 5A, in accordance with a thrust motion of the slide shaft 23. The protruding portion 25c of the urging spring 25 moves while being in contact with the cam portion 21b of the lid body 21, and therefore in the state where the movable shaft 23a of the slide shaft 23 is retracted in the lid body 21, the protruding portion 25c of the urging spring 25 is brought into contact with a portion 21d of the cam portion 21b. As a consequence, the protruding direction of the protruding portion 25c of the urging spring 25 is shifted clockwise, as viewed in FIG. 5C.

More specifically, when the movable shaft 23a of the slide shaft 23 is retracted into the lid body 21 so as to mount the battery lid unit 20 to the apparatus housing 1, the protruding portion 25c of the urging spring 25 changes its position in a manner interlocked with the retraction of the movable shaft 23a. When the protruding portion 25c of the urging spring 25 is in a position shown in FIGS. 4A to 4C before the battery lid unit 20 is mounted to the apparatus housing 1, the urging force of the urging spring 25 in the opening direction continuously acts until the opening angle of the battery lid unit 20 with respect to the apparatus housing 1 becomes equal to approximately 120 degrees. Therefore, a pivotal motion range through which the battery lid unit 20 is capable of being pivotally moved is approximately 120 degrees, and an urging range through which the urging spring 25 urges the battery lid unit 20 is 120 degrees.

On the other hand, when the protruding portion 25c of the urging spring 25 is in a position shown in FIGS. 5A to 5C before the battery lid unit 20 is mounted to the apparatus housing 1, the urging force of the urging spring 25 in the opening direction continuously acts until the opening angle of the battery lid unit 20 with respect to the apparatus housing 1 becomes equal to approximately 90 degrees. In other words, the pivotal motion range through which the battery lid unit 20 is capable of being pivotally moved is approximately 120 degrees, whereas the urging range through which the urging spring 25 urges the battery lid unit 20 is 90 degrees. Therefore, when the battery lid unit 20 is mounted to the apparatus housing 1, the shaft-operating part 23b of the slide shaft 23 is operated to thereby cause the movable shaft 23a to retract into the lid body 21. Then, the angle between the battery lid unit 20 and the apparatus housing 1 is set to an angle where the urging force of the urging spring 25 does not act, whereafter the battery lid unit 20 is mounted to the apparatus housing 1.

Thus, by operating the shaft-operating part 23b, the protruding portion 25c of the urging spring 25 is caused to trace the cam portion 21b, whereby within the pivotal motion range of the battery lid unit 20 with respect to the apparatus housing 1, the urging range through which the urging spring 25 urges the battery lid unit 20 in the opening direction is reduced. This makes it possible to mount the battery lid unit 20 to the apparatus housing 1 without charging the urging spring 25 or by only slightly charging the same.

Figure 6:
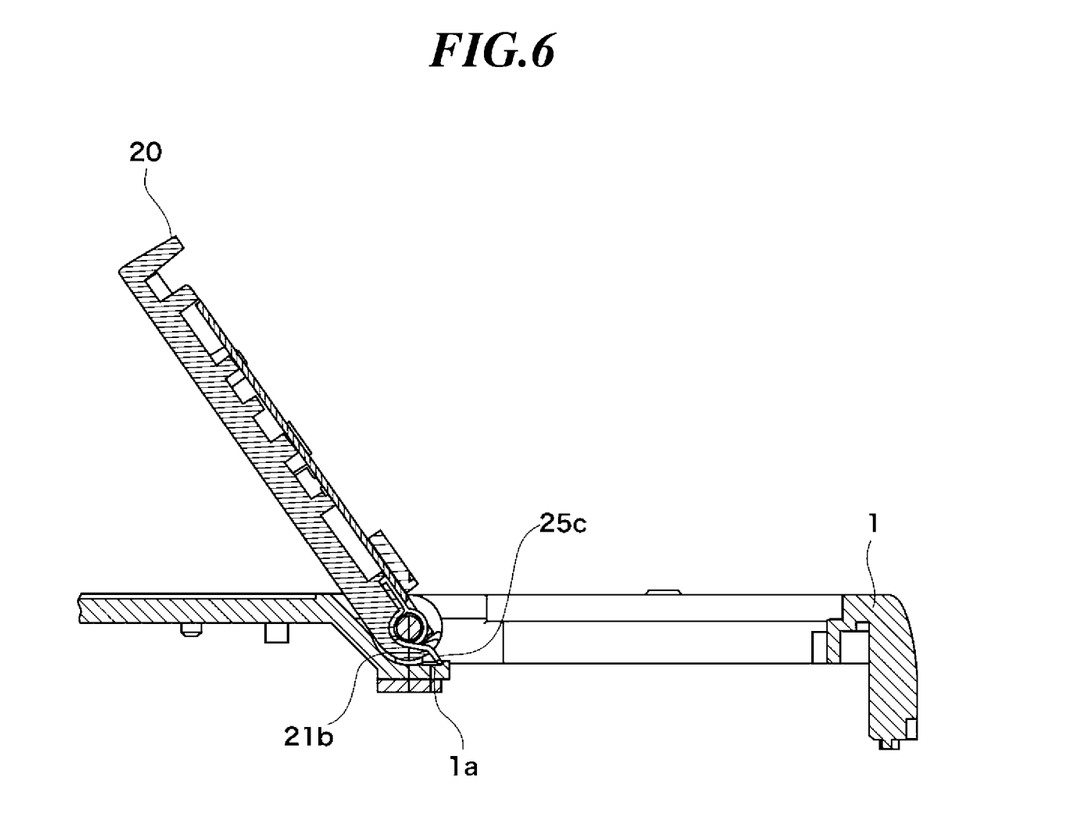
FIG. 6 is a cross-sectional view showing a state of parts of the image pickup apparatus essential to the present invention in which the battery lid unit is opened close to an abutment position in an opening direction.

FIG. 6 is a cross-sectional view showing a state of parts of the image pickup apparatus essential to the present invention in which the battery lid unit 20 is opened close to the abutment position in the opening direction.

Referring to FIG. 6, in the state of the battery lid unit 20 having been mounted to the apparatus housing 1, the protruding portion 25c of the urging spring 25 is brought into abutment with the cam portion 21b of the lid body 21 when the battery lid unit 20 is positioned close to the abutment angle (abutment position) in the opening direction thereof. More specifically, until the battery lid unit 20 is opened close to the abutment angle in the opening direction, the protruding portion 25c of the urging spring 25 continues to be in contact with the contact portion 1a of the apparatus housing 1 without being brought into abutment with the cam portion 21b of the lid body 21, and only after the battery lid unit 20 reaches close to the abutment angle, the protruding portion 25c comes into abutment with the cam portion 21b of the lid body 21.

Thus, the urging force of the urging spring 25 for urging the battery lid unit 20 in the opening direction can continuously act until the battery lid unit 20 reaches close to the abutment angle in the opening direction. It should be noted that the abutment angle (abutment position) of the battery lid unit 20 in the opening direction is intended to mean an angle (position) to which the battery lid unit 20 is pivotally moved in the opening direction, i.e. opened, to the maximum, with respect to the position (closed position) of the battery lid unit 20 in which the battery lid unit 20 covers the battery compartment.

With the above-described construction, the urging force of the urging spring 25 for urging the battery lid unit 20 in the opening direction continuously acts on the battery lid unit 20 which is detachable from the apparatus housing 1, as described above, until the battery lid unit 20 reaches the position corresponding to the abutment angle (approximately 120 degrees in the present embodiment) in the opening direction. If the shaft-operating part 23b is operated at this time, the protruding portion 25c of the urging spring 25 traces the cam portion 21b, whereby the angular range within which the urging spring 25 applies the urging force is reduced to approximately 90 degrees. Consequently, the urging force of the urging spring 25 does not act when the battery lid unit 20 is positioned within a range of opening angles of 90 to 120 degrees, so that the battery lid unit 20 positioned within this range can be easily detached from the apparatus housing 1. This makes it possible to realize a mechanism for holding the detachable battery lid unit 20, which is excellent in mounting and dismounting operability of a battery, and workability in mounting the lid to the apparatus housing.

Further, the urging spring 25 is integrally formed with the protruding portion 25c such that the battery lid unit 20 can be pivotally urged in the opening direction by the urging force generated by torsion of the coil part 25d of the urging spring 25. Furthermore, the lid body 21 as a part of the battery lid unit 20 is formed with the cam portion 21b along which the protruding portion 25c of the urging spring 25 is moved in a direction away from the contact portion 1a of the apparatus housing 1. With this construction, a mechanism for pivotally urging the battery lid unit 20 in the opening direction and a mechanism for moving the protruding portion 25c of the urging spring 25 in the direction away from the contact portion 1a can be realized without adding component parts. This makes it possible to achieve a compact and lightweight mechanism for holding the battery lid unit 20, which is excellent in operability, at low costs.

As described in detail hereinabove, according to the present embodiment, the urging force in the opening direction continuously acts on the battery lid unit which is configured to be detachable from the apparatus housing and openable and closable and is urged in the opening direction, until the battery lid unit reaches an open position where an excellent mounting and dismounting operation of a battery in and from the battery compartment of the apparatus housing can be performed. This makes it possible to improve workability in mounting the battery lid unit to the apparatus housing. Further, the operability of the battery lid unit in opening and closing the same can be improved.

Although in the above-described embodiment, the electronic apparatus of the present invention is applied to the image pickup apparatus (digital camera) by way of example, this is not limitative, but the present invention can also be applied to any other kind of electronic apparatus than the image pickup apparatus insofar as the electronic apparatus has an openable and closable lid which is detachably mounted to an apparatus housing.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-199667, filed Aug. 31, 2009, which is hereby incorporated by reference herein in its entirety.

What is claimed is:

1. An electronic apparatus comprising:
a housing which has a bearing portion; and
a lid which has a shaft and an urging member,
wherein the shaft is movable between a fitted position that the shaft is fitted in the bearing portion and a retracted position that the shaft is retracted from the bearing portion,
wherein the urging member has a contact portion,
wherein in a case when the shaft is fitted in the bearing portion, the contact portion contacts with the housing so that the urging member urges the lid in an opening direction of the lid with respect to the housing, and
wherein in a case when the shaft is retracted from the bearing portion, the contact portion is moved so that an urging range through which the urging member urges the lid in the opening direction becomes smaller than a rotation range of the lid.

2. The electronic apparatus according to claim 1,
wherein the shaft is movable in an axial direction, and
wherein the urging member urges the shaft to the fitted position in the axial direction.

3. The electronic apparatus according to claim 2,
wherein the urging member comprises a coil part acting both as a compression spring and as a torsion spring, and
wherein the urging member urges the shaft to the fitted position by an urging force of the coil part acting in an expanding direction, and urges the lid in the opening direction by an urging force of the coil part acting in a torsional direction.

4. The electronic apparatus according to claim 1,
wherein the lid has a cam portion,
wherein in a case when the shaft is retracted form the bearing portion, the contact portion traces the cam portion whereby the urging range through which the urging member urges the lid in the opening direction becomes smaller than a rotation range of the lid.

5. The electronic apparatus according to claim 1,
wherein the housing has a compartment portion,
wherein in a case when the shaft is fitted in the bearing portion, the lid is openable and closable the compartment portion.

6. The electronic apparatus according to claim 5,
wherein the compartment portion is a battery compartment portion.

7. An electronic apparatus comprising:
a housing which has a bearing portion; and
a lid which has a shaft and an urging member,
wherein the shaft is movable between a fitted position that the shaft is fitted in the bearing portion and a retracted position that the shaft is retracted from the bearing portion,
wherein the urging member has a contact portion,
wherein in a case when the shaft is fitted in the bearing portion, the contact portion contacts with the housing so that the urging member urges the lid in an opening direction of the lid with respect to the housing, and
wherein in a case when the shaft is retracted from the bearing portion, the contact portion is moved so that a rotation range of the lid through which the urging member does not urge the lid in the opening direction is provided.

8. The electronic apparatus according to claim 7,
wherein the shaft is movable in an axial direction, and
wherein the urging member urges the shaft to the fitted position in the axial direction.

9. The electronic apparatus according to claim 8,
wherein the urging member comprises a coil part acting both as a compression spring and as a torsion spring, and
wherein the urging member urges the shaft to the fitted position by an urging force of the coil part acting in an expanding direction, and urges the lid in the opening direction by an urging force of the coil part acting in a torsional direction.

10. The electronic apparatus according to claim 7,
wherein the lid has a cam portion,
wherein in a case when the shaft is retracted form the bearing portion, the contact portion traces the cam portion whereby the rotation range of the lid through which the urging member does not urge the lid in the opening direction is provided.

11. The electronic apparatus according to claim 7,
wherein the housing has a compartment portion,
wherein in a case when the shaft is fitted in the bearing portion, the lid is openable and closable the compartment portion.

12. The electronic apparatus according to claim 11,
wherein the compartment portion is a battery compartment portion.

* * * * *